Patented Feb. 12, 1946

2,394,739

UNITED STATES PATENT OFFICE 2,394,739

DEHYDROGENATION OF HYDROCARBONS

Raymond C. Archibald, Berkeley, Calif., assignor to Shell Development Company, San Francisco, Calif., a corporation of Delaware No Drawing. Application March 16, 1942, Serial No. 434,893

9 Claims. (Cl. 260—668)

This invention relates to an improved method for the catalytic dehydrogenation of hydrocarbons boiling in the gasoline boiling range with sulf-active catalysts consisting essentially of pilled dehydrogenating metal sulfides. More particularly, the invention relates to a method for increasing the effective life of the catalyst in said process by a periodic treatment of the catalyst in situ.

As is known, there is a great demand for an economical and practical process for the catalytic dehydrogenation of the lighter hydrocarbons such as hydrocarbons boiling within the gasoline boiling range. Most of the hydrocarbon materials which it is desired to treat by catalytic dehydrogenation are derived from petroleum and/or coal tar distillates and contain from traces to appreciable amounts of sulfur compounds. A practical catalytic dehydrogenation process suitable for use with these hydrocarbon materials therefore requires the use of a sulf-active catalyst. Many processes have been developed wherein these various hydrocarbon materials are dehydrogenated using dehydrogenating metal oxide catalysts. In general, the dehydrogenating metal oxides are very active dehydrogenating catalysts at elevated temperatures and are employed in relatively small amounts supported upon major amounts of suitable adsorbent carriers such, in particular, as active alumina. Some of these proposed processes are suitable for certain applications. All of them, however, have the great disadvantage that they require so-called "short cycle" operation. When using these metal oxide type catalysts, it is invariably necessary when effecting catalytic dehydrogenation to stop the process every few hours and burn off the deposited carbonaceous materials with oxygen or an oxygen-containing gas. This periodic regeneration of the catalyst which must be effected several times per day is not only time-consuming and expensive but materially decreases the production capacity per catalytic converter. Furthermore, the periodic regeneration by burning carbonaceous deposits with air subjects the apparatus to frequent temperature change and alternate oxidizing and reducing conditions. This requires that these processes be effected in apparatus constructed of special steels or alloys. Furthermore, even with the best steels the alternating oxidizing and reducing conditions soon cause a certain breakdown resulting in the poisoning of the catalyst by iron. The rate of deposition of carbonaceous materials upon the catalyst in certain processes can be repressed to a certain extent by the use of hydrogen pressure. This, however, is generally considered impractical inasmuch as under high hydrogen pressures the dehydrogenation reaction is usually considerably repressed. On the other hand, very excellent sulf-active catalysts which may be applied under very high hydrogen pressures have been developed particularly for use in destructive hydrogenation of higher boiling hydrocarbons. One type of such catalysts consists essentially of a mixture of metal sulfides. Under the conditions for which these catalysts were intended, that is, for destructive hydrogenation, considerable hydrogen pressures prevail and there is little deposition of carbonaceous material. Consequently, under these conditions these catalysts have a very long active life. Furthermore, in the destructive hydrogenation when the catalyst is finally spent, the valuable components are recovered and regenerated. The regeneration in this case is, however, not similar to that employed in the above-mentioned oxide type catalyst but consists in an entire remaking of the catalyst.

It is found that the above-described sulf-active catalysts are very suitable for the catalytic dehydrogenation of lighter hydrocarbons, for example, dehydrogenatable hydrocarbons boiling in the gasoline boiling range. In the use of these catalysts for this purpose, dehydrogenation rather than hydrogenation conditions prevail, carbonaceous materials gradually deposit upon the catalyst, and in time the dehydrogenation activity of the catalyst declines. Since, however, in the dehydrogenation of such hydrocarbons with catalysts of this type certain quantities of hydrogen, for instance 1–50 atmospheres, are suitably employed, the deterioration of the catalyst by carbonaceous deposits is very slow. These catalysts may therefore be employed for the dehydrogenation of these hydrocarbons over relatively long periods, for instance 400 hours, before regeneration of the catalyst is necessary. This, it will be seen, is a distinct advantage over the use of the above-described oxide type catalysts.

These sulf-active metal sulfide catalysts can be applied to carrier materials, as described, for the oxide type catalysts and, in such cases, can be regenerated by conventional means, that is, by burning off the carbonaceous deposits with air. During such regeneration, however, the metal sulfides are converted to the corresponding oxides and after the carbonaceous deposits have been removed, it is necessary to subject the catalyst to a thorough sulfurization. This latter step is often difficult and expensive to accomplish as the sulfurization should be very complete. These sulfide catalysts, however, are not as active as the corresponding oxide catalysts for dehydrogenation and therefore these metal sulfides supported in small amounts upon relatively inert carrier materials are not generally considered satisfactory for this purpose. It would be much preferred to use these sulf-active metal sulfide catalysts in a much more concentrated form such, for instance, as in the form of pills consisting largely of the active metal sulfides. However, no method has hitherto been known whereby such pills which have been deactivated in the catalytic dehydrogenation could be reactivated. The usual methods involving combustion of the carbonaceous deposits with oxygen or oxygen-bearing gases causes the pills to lose strength and crumble. Oxygen-containing gases such as air, steam, etc. are furthermore unsuitable inasmuch as they convert the metal sulfides to the corresponding metal oxides.

It has now been found that pills consisting essentially of the above-described dehydrogenating metal sulfides when deactivated in the catalytic dehydrogenation of hydrocarbons can be advantageously reactivated in situ by treatment with sulfur dioxide. It has been found that whereas regeneration by oxygen causes the catalyst pills to immediately crumble, repeated reactivation of the catalyst with sulfur dioxide leaves the catalyst pills substantially unaffected in physical shape and strength. Furthermore, the use of sulfur dioxide to reactivate the above-described sulfide catalysts, it is found, does not cause substantial oxidation of the metal sulfides and does not require a subsequent re-sulfurization of the catalyst. It is furthermore found that the reactivation of these catalysts with sulfur dioxide is very effective, may be effected in a very short time, and does not require substantial change in the temperature conditions in the reactor. The process of the present invention then consists essentially in dehydrogenating hydrocarbons boiling within the gasoline boiling range under known dehydrogenating conditions with pilled sulf-active dehydrogenation catalysts consisting essentially of pilled dehydrogenating metal sulfide and periodically restoring the activity of the catalyst by a treatment in situ with sulfur dioxide.

The present activation treatment is applicable to any of the pilled dehydrogenating metal sulfide catalysts of the above-described type. It is especially suitable for the treatment of dehydrogenating metal sulfide catalysts consisting essentially of a sulfide of a metal selected from group VI of the periodic system and a sulfide of a metal selected from group VIII of the periodic system. For example, it is especially suitable for use with catalysts consisting essentially of a pilled mixture of tungsten sulfide and nickel sulfide. These metal sulfides when pilled in the pure form often yield hard strong pills having a metallic luster. In certain cases, however, the use of a small amount of one of the many known binders is advantageous. Also, the dehydrogenating metal sulfide or mixture of such sulfides may be pilled in admixture with a minor amount of a relatively inert material such as a powder of alumina, kieselguhr, clay or the like. In the appended claims when referring to these catalysts the expression "consisting essentially of" is not meant to exclude minor amounts of such extenders in the catalyst pills.

These catalysts are especially suitable and may be employed for the dehydrogenation of dehydrogenatable liquid hydrocarbons boiling in the gasoline boiling range such, in particular, as naphthenic hydrocarbons and fractions of naphthenic straight run gasolines. The conditions applicable for the catalytic dehydrogenation of these various hydrocarbons and/or hydrocarbon mixtures with catalysts of this type are well known. By way of examples, approximately suitable conditions are:

| | |
|---|---|
| Temperature _____°C__ | 425–525 |
| Total pressure _____atm__ | 10–50 |
| Hydrogen _____mols/mol__ | 2–10 |
| Liquid hourly space velocity_____ | 0.5–3 |

After these catalysts have been used on-stream for some time the activity gradually declines to a point where it is desirable to subject them to a regeneration treatment. The hydrocarbon feed is discontinued and excess hydrocarbons purged from the catalyst, preferably with hydrogen or with an inert gas. Sulfur dioxide gas is then passed through the catalyst for a time sufficient to give the desired degree of activation.

The time required for the reactivation treatment depends upon several factors such, in particular, as the amount of catalyst, the length of the catalyst bed, the rate of addition of sulfur dioxide, and the temperature. One of the advantages of the present process, however, is that the activation may be effected in a very short time. Thus, the reactivation requires, in general, only a fraction of the time required to regenerate oxide catalysts with oxygen-containing gases. For example, converters of conventional size and design may usually be reactivated in one-half to four hours. Longer periods of reactivation such as five to ten hours are, however, in no way detrimental. During the reactivation treatment very little sulfur dioxide is found in the exit gas. When the sulfur dioxide passes through the catalyst mass and appears in the exit gas the reactivation is substantially complete.

The reactivation of the above-described pilled catalysts according to the present process is exothermic. When applying the process to large masses of the catalyst it is therefore necessary to control the rate of passage of sulfur dioxide to avoid deactivation of portions of the catalyst by local overheating. The sulfur dioxide employed in the reactivation may also, if desired, be diluted, for example, with nitrogen, but this is usually unnecessary.

A great advantage of the present process is that the reactivation may be effected in situ over a wide range of temperatures. The reactivation according to the present process may therefore be conveniently effected at the temperature at which the catalyst is employed in the dehydrogenation. Thus, for example, when effecting the dehydrogenation process in the above-mentioned temperature range of 425° C.–525° C., the reactivation may be effected at the reaction temperature. Thus, the delays in bringing the reactor from the reaction temperature to the reactivation temperature and vice versa are avoided. Also, the cost of heating and cooling and the detrimental effect of substantial temperature changes on the reactor and the catalyst are avoided. The temperature of the reactivation may, however, if desired, be above or below the reaction temperature. The maximum reactivation temperature depends upon the thermal stability of the catalyst. With most catalysts of the type in question temperatures up to about 750° C. may be applied. In general, however, no advantage is gained in applying temperatures above about 600° C. The minimum applicable temperature also depends somewhat upon the catalyst. In the reactivation of the spent catalyst with sulfur dioxide a pronounced heat effect is observed. The minimum applicable temperature is the lowest temperature at which this heat effect is observed In case it is desired to effect the reactivation at the lowest possible temperature, sulfur dioxide may be passed through the catalyst mass at a low temperature and the temperature gradually raised until the heat effect is observed. Although temperatures as low as 200° C. may sometimes be employed, the reactivation is, in general, preferably effected at temperatures of at least 400° C. where the reactivation is considerably faster.

The reactivation may be effected at any desired pressure. Ordinary pressures are, however, quite suitable and little advantage is gained in applying higher pressures.

The reactivation according to the present process, although it is very effective, does not remove all of the carbonaceous deposits which are found in the spent catalyst. During use of the catalyst in dehydrogenation with periodic reactivation with sulfur dioxide as described, the amount of carbonaceous deposits in the catalyst gradually increases and the on-stream period between successive reactivations gradually decreases. After a number of dehydrogenation periods with periodic reactivation with sulfur dioxide as described, it is sometimes advantageous to interpose a conventional regeneration with oxygen or an oxygen-containing gas followed by a resulfurization of the catalyst. Such a conventional regeneration treatment can, however, only be applied a relatively few times during the life of the catalyst since, as pointed out above, such treatment causes the catalyst pills to disintegrate. Such a treatment can, however, usually be applied once or twice and the combination of the periodic reactivation with sulfur dioxide with an occasional conventional regeneration with oxygen-containing gases allows the catalyst to be used an exceptionally long time in situ. When the catalyst pills after one or more conventional regenerations with oxygen-containing gases disintegrate, the pressure drop through the catalyst bed increases and it is necessary to replace the catalyst with fresh catalyst. The totally spent catalyst can sometimes be repelleted with a binder but is usually treated to recover valuable metals.

*Example*

A catalyst consisting of a pilled mixture of tungsten sulfide and nickel sulfide in a mol ratio of 1:2 was employed in the dehydrogenation of a methyl cyclohexane fraction from a petroleum straight run gasoline under the following conditions:

Temperature _____°C__ 490
Total pressure_____atms__ 30
Hydrogen _____mols/mol hydrocarbon__ 7
Liquid hourly space velocity_____ 1.5

After an extended period of use the activity of the catalyst (as measured by the conversion of methyl cyclohexane to toluene) decreased to an uneconomical figure. The catalyst was then reactivated in situ by passing a slow stream of sulfur dioxide through the bed of catalyst pills for 5 hours at 550° C. and approximately atmospheric pressure. The catalyst was then flushed with hydrogen and again applied in the catalytic dehydrogenation under the same conditions. The conversion (96.3%) obtained with the reactivated catalyst was more than double that of the partially spent catalyst and substantially equivalent to that of the freshly prepared catalyst.

The reactivated catalyst was then used in the dehydrogenation for 131 hours under the same conditions, during which time the conversion gradually declined to about 69%. The catalyst was then again treated with sulfur dioxide for ½ hour and flushed with hydrogen. Upon being used again in the dehydrogenation the conversion was about 92%.

The twice-reactivated catalyst was used again in the dehydrogenation under the same conditions for 185 hours during which time the conversion gradually declined to about 60%. The catalyst was then reactivated a third time with a mixture of about 25% sulfur dioxide and 75% nitrogen for 5 hours at 490° C. and ordinary pressure. Upon being put back in use the conversion was about 89%.

The process was continued with periodic reactivation of the catalyst until the total catalyst life was over 1400 hours. In spite of the repeated reactivations the catalyst pills were not disintegrated.

It is known that in certain cases catalysts used in the contact sulfuric acid process may be activated to some extent by a suitable treatment with sulfur dioxide feed in the absence of air. This is, however, totally unrelated to the regeneration of pilled sulfide catalysts deactivated in the dehydrogenation of organic materials. The use of sulfur dioxide in admixture with air has also been recommended in certain cases for the regeneration of oxide catalysts. This treatment, as explained above, causes oxidation of the present sulfide catalysts.

It has also been proposed to remove halogenated compounds from catalysts poisoned therewith by treatment with sulfur dioxide. However, no process was hitherto known for the regeneration of the above-described pilled sulfide catalysts which have been deactivated in the dehydrogenation of hydrocarbons wherein no poisoning of the catalyst with halogenated compounds takes place.

I claim as my invention:

1. In a process for the catalytic dehydrogenation of halogen-free hydrocarbons boiling in the gasoline boiling range with the aid of sulf-active catalysts consisting essentially of a pilled dehydrogenating metal sulfide, the improvement which comprises periodically restoring the dehydrogenating activity of said catalyst by treatment in situ with sulfur dioxide.

2. In a process for the catalytic dehydrogenation of halogen-free hydrocarbons boiling in the gasoline boiling range with the aid of a sulf-active catalyst consisting essentially of a pilled mixture of a sulfide of a metal of group VI of the periodic system and a sulfide of a metal of group VIII of the periodic system, the improvement which comprises treating said catalyst in situ with sulfur dioxide and then flushing the catalyst with hydrogen.

3. In a process for the catalytic dehydrogenation of halogen-free hydrocarbons boiling in the gasoline boiling range with the aid of sulf-active catalysts consisting essentially of a pilled mixture of tungsten sulfide and nickel sulfide, the improvement which comprises periodically restoring the dehydrogenating activity of said catalyst by treatment in situ with sulfur dioxide.

4. In a process for the catalytic dehydrogenation of halogen-free hydrocarbons boiling in the gasoline boiling range with the aid of sulf-active catalysts consisting essentially of a pilled dehydrogenating metal sulfide, the improvement which comprises periodically restoring the dehydrogenating activity of said catalyst by treatment in situ with sulfur dioxide and, after a number of such periodic treatments with sulfur dioxide, burning carbonaceous deposits from said catalyst with a stream of oxygen-containing gas and resulfidizing the catalyst.

5. The process for restoring the activity of a sulf-active catalyst consisting essentially of a pilled metal sulfide and which has been deteriorated by non-halogen-containing deposits which comprises treating said catalyst in situ with sulfur dioxide and then flushing the catalyst with hydrogen.

6. The process of restoring the dehydrogenating activity of a sulf-active catalyst consisting essentially of a pilled mixture of a sulfide of a metal selected from group VI of the periodic system and a sulfide of a metal selected from group VIII of the periodic system and which has been deteriorated by non-halogen-containing deposits which comprises treating said catalyst in situ with sulfur dioxide and then flushing the catalyst with hydrogen.

7. The process for restoring the dehydrogenating activity of a sulf-active catalyst consisting essentially of a pilled mixture of tungsten sulfide and nickel sulfide and which has been deteriorated by non-halogen-containing deposits which comprises treating said catalyst in situ with sulfur dioxide and then flushing the catalyst with hydrogen.

8. A method for maintaining the dehydrogenating activity of a sulf-active catalyst consisting essentially of a pilled dehydrogenating metal sulfide in the catalytic dehydrogenation of non-halogen contaminated hydrocarbons, which comprises periodically treating said catalyst in situ with sulfur dioxide and, after a number of such periodic treatments with sulfur dioxide, burning carbonaceous deposits from said catalyst with a stream of oxygen-containing gas, and resulfidizing the catalyst.

9. In a process for the catalytic treatment of a halogen-free hydrocarbon with the aid of a sulf-active catalyst consisting essentially of a pilled metal sulfide under a positive pressure of added hydrogen and under conditions conducive to the dehydrogenation of hydroaromatic hydrocarbons, the improvement which comprises periodically restoring the activity of said catalyst by treatment in situ with sulfur dioxide.

RAYMOND C. ARCHIBALD.